Sept. 29, 1970   M. TRUPPE ET AL   3,530,716
DEVICE FOR CONTINUOUSLY MEASURING THE TEMPERATURE OF METAL
BATHS IN MELTING OR REFINING FURNACES, PARTICULARLY
IN CONVERTERS
Filed Aug. 27, 1968                                3 Sheets-Sheet 1

INVENTORS.
MEINHARD TRUPPE,
MATTHIAS SCHERNTHANER &
BY GÜNTER POFERL
Brumbaugh, Graves, Donohue & Raymond
their ATTORNEYS.

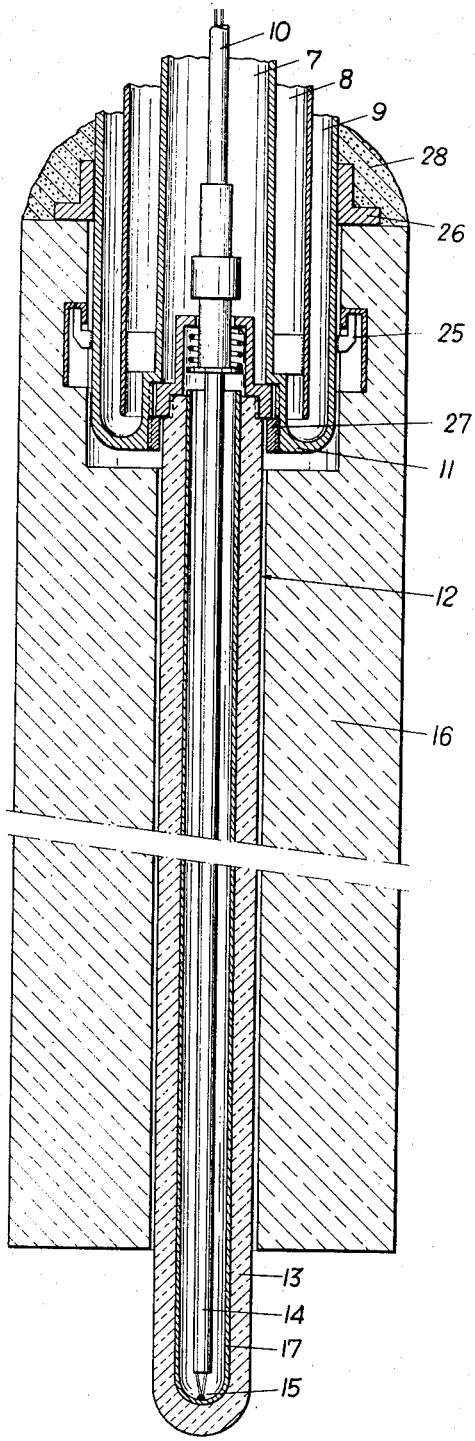

United States Patent Office 3,530,716
Patented Sept. 29, 1970

3,530,716
DEVICE FOR CONTINUOUSLY MEASURING THE TEMPERATURE OF METAL BATHS IN MELTING OR REFINING FURNACES, PARTICULARLY IN CONVERTERS
Meinhard Truppe, Matthias Schernthaner, and Gunter Roferl, Linz, Austria, assignors to Vereinigte Osterreichische Eisen- und Stahlwerke Aktiengesellschaft, Linz, Austria, an Austrian company
Filed Aug. 27, 1968, Ser. No. 755,557
Claims priority, application Austria, Sept. 19, 1967,
A 8,518/67; May 15, 1968, A 4,657/68
Int. Cl. G01k 1/12, 7/02
U.S. Cl. 73—343       7 Claims

ABSTRACT OF THE DISCLOSURE

A device for continuously measuring the temperature of metal baths in melting or refining furnaces. This device is lowerable from the top into the hot metal charge and consists essentially of a water-cooled probe, to the head of which a measuring instrument is attached. The measuring instrument is provided with a sheath tube consisting of refractory material, at least on its tip, containing a thermocouple, and with a detachable outer shell made of refractory material.

---

The present invention relates to a device for continuously measuring the temperature of metal baths in melting or refining furnaces, particularly in converters, said device being lowerable from the top into the hot metal charge of the furnace.

Various devices for temperature measurements of hot metal media have been proposed, said devices containing a thermocouple, e.g. platinum-rhodium/platinum, encased in a sheath tube of a highly refractory material. Such devices are used in particular for continuous temperature measurement in refining converters, in which the temperature behavior provides characteristic data on the progress of refining. It has been proposed to place immersion pyrometers of this type laterally through the converter shell and the converter brickwork into the hot metal bath, the hot junction of the thermocouple being in alignment with the converter brickwork or projecting into the interior of the converter. Continuous measurements have, however, been difficult, as the indicating accuracy has not always been satisfactory owing to the fact that the latter has been influenced by the temperature of the converter brickwork; moreover thermocouples projecting into the interior of the converter are easily damaged during charging.

It is also known to use temperature measuring instruments lowerable from the top into the hot metal bath and containing a thermocouple encased by a sheath tube of highly refractory material, said sheath tube forming the tip of a water-cooled, lift- and lowerable lance. As upon insertion of the measuring instrument from the top said instrument must pierce through the slag layer floating on the bath, that part of the instrument contacting the slag must be of particular strength, as the slag is much more aggressive than the metal bath. For protecting that part of the instrument lying within the slag area it is necessary to use a very resistant, highly refractory material on a ceramic basis. Thus the lance of such known devices is, e.g. designed as a supporting tube provided on its lower part with a shoulder which supports a shell consisting of refractory protective bricks. The tip of the sheath tube, the lance head and the protective shell are inseparably connected by a ceramic mass rammed onto them.

It is an object of the present invention to provide an improved device for continuously measuring the temperature of metal baths in melting or refining furnaces, particularly in converters, said device being lowerable from the top into the hot metal charge of the furnace and being provided with a water-cooled probe, to the head of which probe a sheath tube containing a thermocouple is attached, at least the tip of said tube consisting of a highly refractory material, said device being designed so as to have a high indicating accuracy and to be independent of the heating-up degree of the brickwork varying with the charging sequence. It is a further object of the invention to avoid measuring errors arising from slag contamination of the measuring site and to eliminate the risk of cooling water escaping below the bath surface upon damage of the instrument.

The device of the invention with which these objects are achieved comprises a sheath tube which is provided with a detachable shell made of refractory material. The dimension of the axial extension of this shell is chosen so as to enable protection against slag affection of the measuring portion of the probe being within the slag area during the measuring operation. The shell suitably is composed of two semicylindrical suspended bricks.

According to a preferred embodiment of the invention the sheath tube and the thermocouple form a structural unit, which is detachably arranged on the probe head and plug-connected in the probe head to a pair of output conductors having a thermal voltage characteristic such that voltages representing the temperature readings can be transmitted to a point remote from the thermocouple without variation resulting from temperature changes along the transmission path. Such a pair of conductors may be termed a compensating line since it compensates for temperature effects. The plug connection may contain a spring element, which effects continuous engagement of the hot junction of the thermocouple with the closed end of the sheath tube and thus safeguards an accurate heat transfer to the hot junction.

Moreover, it has been found that for securing a high indicating accuracy it is necessary to choose specific dimensions for the measuring portion of the measuring lance and the detachable shell as well as to use material having specific properties for the protective shell.

According to this further development of the invention the longitudinal extension of the not-water-cooled measuring portion is greater than 250 mm., the measuring point of the measuring portion is spaced from the detachable outer shell by at least 40 mm. and the thermal inertia of the detachable outer shell $s/\lambda$ is greater than 0.03 m²h. °C., $\lambda$ being the heat conduction coefficient and $s$ the wall thickness of the detachable refractory shell. Preferably the shell consists of magnesite or highly aluminous bricks or masses of highly refractory material, referred to as "ramming" masses (e.g., having the following composition: $Fe_2O_3$—4 to 6%; $MgO$—83 to 88%; $CaO$—2 to 3%; $SiO_2$—0.4 to 0.6%; $Al_2O_3$—3.5 to 3.7%; annealing loss—approximately 1.3%) its thickness being 60–80 mm.

Said measures of providing a measuring portion having a minimum length, of selecting a refractory material having a definite minimum thermal inertia and choosing a definite thickness for the shell, maintain the great temperature gradient necessary between the measuring point of the device and that part of the measuring instrument contacting with the water-cooled lance. Whereas the measuring point, i.e. the hot junction of the thermocouple, assumes a temperature corresponding to the bath temperature to be measured, e.g. 1600–1800° C., the temperature of the compensating line projecting out of the upper end of the measuring portion and into the water-cooled portion of the measuring lance is not higher than about 50° C.

The measure of providing the measuring point at a definite minimum distance from the refractory shell, i.e. of letting the sheath tube containing the thermocouple surpass the shell toward the bottom by at least 40 mm., prevents the results of the measurements from being influenced by heat dissipation from the hot junction and avoids indication inertia.

The dimension chosen for the wall thickness of the refractory shell according to the invention secures a heat transition value not exceeding about 25,000 Kcal./m.²h. If, for instance, the wall thickness of the shell is 60 mm. and upon attaining a stationary temperature field the exterior temperature of the refractory shell submerged in the metal amounts to $T_a = 1500°$ C. and the interior temperature thereof to $T_i = 700°$ C., the use of a highly refractory material with a heat conduction coefficient of $\lambda = 1.65$ Kcal./m.h. °C. will lead to a thermal inertia of $s/\lambda 0.0365$ m.²h. °C./Kcal. and, according to the formula $$q = \frac{T_a - T_i}{\frac{s}{\lambda}}$$

to a heat transition of 22,000 Kcal./m.²h. If, upon prolonged use, the thickness of the refractory shell of the instrument—as a consequence of slag aggression—diminishes to less than 60 mm., the shell must be reinforced by applying patching or the like.

In order that the invention may be more fully understood an embodiment thereof will now be described by way of example with reference to the accompanying drawings in which FIG. 1 shows a converter with the measuring device of the invention adjusted to operating position;

FIG. 2 is a vertical sectional view of the measuring portion of the device;

Figure 1:
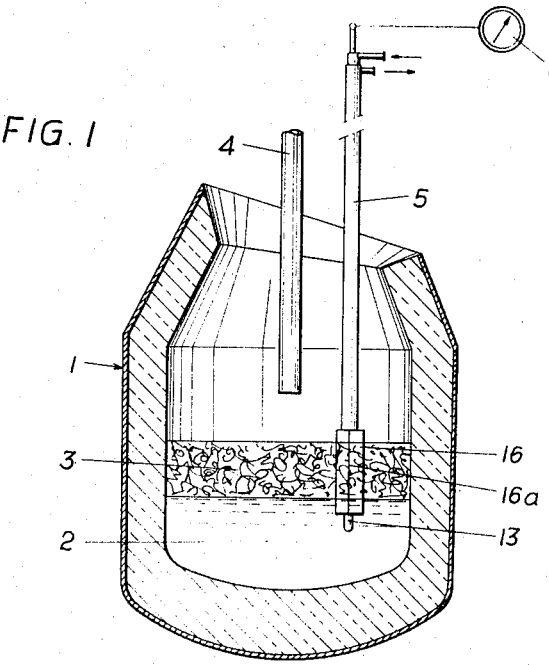

In FIG. 1 numeral 1 denotes a converter containing a liquid iron bath 2 covered by the slag layer 3. Above the bath an oxygen blowing lance 4 is placed in position; 5 is the measuring probe being lift- and lowerable, water-cooled and connected with an indicator 6.

Figure 3:
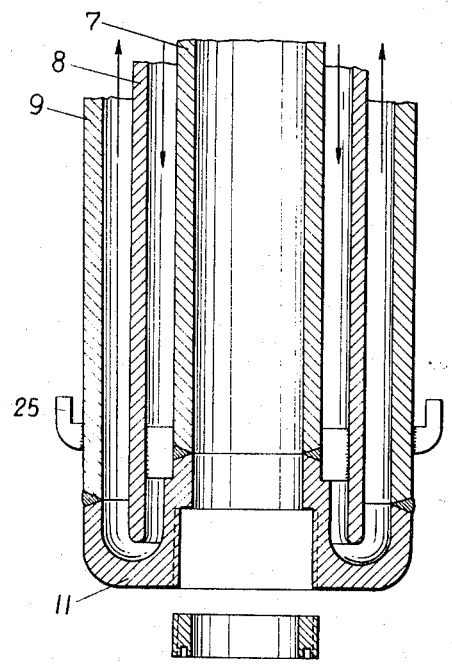
FIG. 3 is a vertical section of the probe head.
Figure 4:
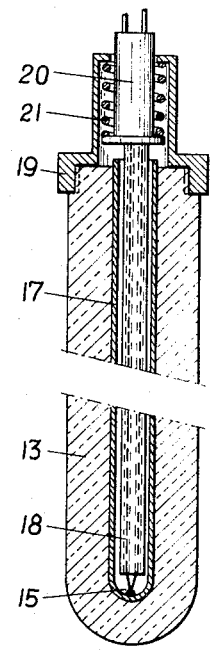
FIGS. 4 and 5 shows two different embodiments of the measuring portion of the probe.

According to FIG. 2 the probe consists of three concentric tubes 7, 8 and 9, the inner tube 7 containing the compensating line, i.e. two conductors housed in a sleeve 10, which conductors serve as an outward connection of the thermocouple elements incorporated in the measuring portion of the device. The tube 9 of the probe is connected with the inner tube 7 in the manner illustrated in FIG. 3 and forms the probe head 11. The tube 8 ends above the probe head, it represents a guide tube for the formation of a cooling cycle, as indicated by the arrows in FIG. 3. In FIG. 2 numeral 12 denotes the measuring portion of the device of the invention attachable to the probe head. Said measuring portion consists of a sheath tube 13 housing the thermocouple 14 with its hot junction 15 and of the shell 16, which is made of refractory material and envelops the sheath tube. The sheath tube 13 consists of refractory material too, either over its full length or at least on its tip projecting out of the shell 16. The length of the shell, i.e. its axial extension, is selected so as to protect the measuring portion of the device against slag affection. Within the sheath tube 13 a gas-tight tube 17 may be provided, in which the branches of the thermocouple are located. They may be installed in a two-bore insulating stick, as known per se. This embodiment is illustrated in more detail in FIG. 4, wherein 13 denotes the sheath tube, 17 the gas-tight tube and 18 the two-bore insulating stick with the couple of elements. At its top the sheath tube carries a sleeve 19, in which a plug device 20 is inserted. The spring 21 provides for a continuous contact between the hot junction 15 and the sheath tube 13 and the gas-tight tube 17.

Figure 5:
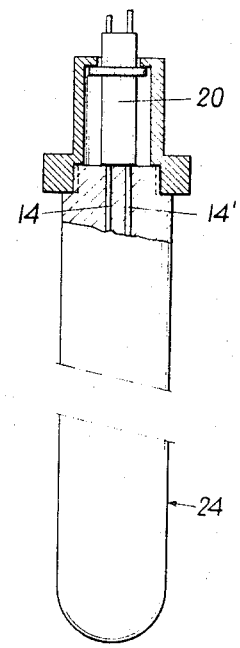

Another embodiment of the measuring portion is shown in FIG. 5, wherein the sheath tube has a thicker wall; it forms a temperature measuring stick 24 containing the insulated couple of elements 14, 14'; the hot junction is sintered in at the lower end of the temperature measuring stick. In the same way as in the embodiment shown in FIG. 4, a plug connection 20 is provided to enable a ready connection of the measuring portion with the compensating line ending in the probe head.

The shell 16 preferably consists of semicyclindrical bricks suspended on hooks 25 provided on the outer tube 9 of the probe, said brick contacting along the joint 16a. 26 is a flange fixed to the tube 9, which flange holds together the two brick-halves and secures their mounting on the hooks 25. During operation said flange is protected by application thereto of a small amount of a highly refractory lubricating mass 28. 27 is a cap nut, by which the measuring portion 12 is fixed to the probe head after the plug connection has been established.

Figure 6:
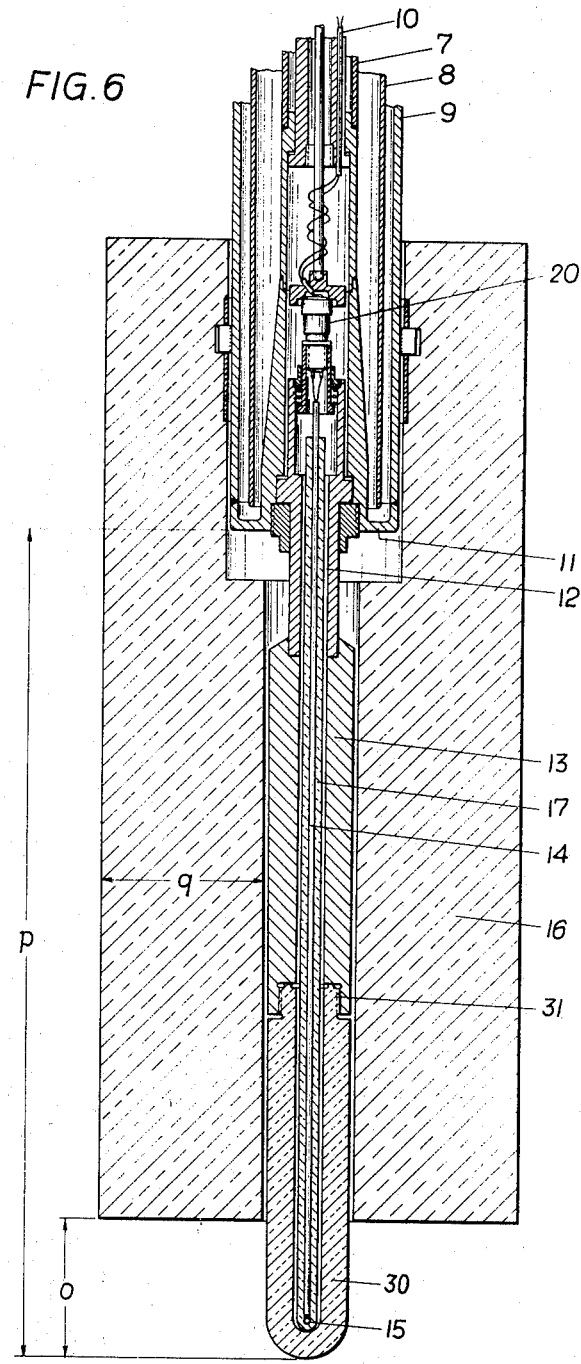
FIG. 6 shows a vertical section of a modified embodiment of the measuring portion.

In FIG. 6, showing a modified embodiment of the measuring portion, like numerals are used for like parts as shown in FIG. 2. As in FIG. 2 the measuring portion comprises a sheath tube 13, housing a gas-tight tube 17, which contains the thermocouple 14 with its hot junction 15. The sheath tube 13, the lance head 11 and the lower end of the lance are encased by a shell 16 of refractory material. The lower portion of the sheath tube 13 consists of a tube portion 30 made of metal ceramic material, the upper portion thereof consists of a steel tube. The two tubes are detachably screwed together by means of a thread connection 31. Suitably the sheath tube consists of steel over up to ⅔ of its length and of a metal ceramic material over up to ⅓ of its length. As illustrated in the drawing the tube portion 30 consisting of a metal ceramic material surpasses the lower end of the shell by the distance $o$. According to the invention said distance should be at least 40 mm. The longitudinal extension of the measuring portion, which projects out of the probe and is not water-cooled, is designated with $p$ in the drawing. Said longitudinal extension should be greater than 250 mm. Reference $q$ denotes the wall thickness of the refractory shell, according to the invention said thickness should amount to 60–80 mm.

What we claim is:

1. A device for continuously measuring the temperature of a metal bath in a furnace, adapted to be lowered into said bath from above and comprising a water-cooled probe having a probe head supporting a non-cooled measuring portion at its upper end, said measuring portion comprising a thermocouple with a hot junction at its lower end, a gas-tight tube enclosing said thermocouple, and a sheath tube enclosing said gas-tight tube and consisting, at least in the region adjacent said hot junction, of a highly refractory material, said sheath tube being covered over the major part of its longitudinal extension by a detachable outer shell made of refractory material, said detachable shell being so dimensioned that the lower end of said measuring portion containing said thermocouple remains uncovered by said shell.

2. A device for continuously measuring the temperature of a metal bath in a furnace, adapted to be lowered into said bath from above and comprising a water-cooled probe having a probe head supporting a non-cooled measuring portion, said measuring portion comprising a sheath tube consisting of steel up to ⅔ of its length, with the remaining portion including the region of its free tip being of a metal ceramic material and containing a thermocouple with a hot junction, said sheath tube being provided with a detachable outer shell made of refractory material.

3. A device for continuously measuring the temperature of a metal bath in a furnace, adapted to be lowered into said bath from above and comprising a water-cooled probe having a probe head supporting a non-cooled measuring portion, said measuring portion comprising a sheath tube consisting, at least in the region of its free tip, of a highly refractory material and containing a thermocouple with a hot junction, said sheath tube being provided with a detachable outer shell consisting of two semicylindrical suspended bricks of refractory material.

4. A device for continuously measuring the temperature of a metal bath in a furnace, adapted to be lowered into said bath from above and comprising a water-cooled probe having a probe head supporting a non-cooled measuring portion, said measuring portion comprising a sheath tube consisting, at least in the region of its free tip, of a highly refractory material and containing a thermocouple with a hot junction, said sheath tube being provided with a detachable outer shell made of refractory material, said sheath tube and said thermocouple forming a structural unit detachably mounted on said probe head and plug-connected with a compensating line ending in said probe head.

5. A device for continuously measuring the temperature of a metal bath in a furnace, adapted to be lowered into said bath from above and comprising a water-cooled probe having a probe head supporting a non-cooled measuring portion, said measuring portion comprising a sheath tube consisting, at least in the region of its free tip, of a highly refractory material and containing a thermocouple with a hot junction, said sheath tube being provided with a detachable outer shell made of refractory material and said measuring portion being connected by a plug connection to a compensating line ending in said probe head, said plug connection including spring means urging said thermocouple hot junction to engage said sheath tube tip.

6. A device for continuously measuring the temperature of a metal bath in a furnace, adapted to be lowered into said bath from above and comprising a water-cooled probe having a probe head supporting a non-cooled measuring portion, said measuring portion having a longitudinal extension of more than 250 mm., and comprising a sheath tube consisting, at least in the region of its free tip, of a highly refractory material and containing a thermocouple with a hot junction, said sheath tube being provided with a detachable outer shell made of refractory material, said hot junction being spaced from said detachable outer shell by at least 40 mm., and said detachable outer shell having a thermal inertia of more than 0.03 m.²h. °C./Kcal.

7. A device for continuously measuring the temperature of a metal bath in a furnace, adapted to be lowered into said bath from above and comprising a water-cooled probe having a probe head supporting a non-cooled measuring portion, said measuring portion comprising a sheath tube consisting, at least in the region of its free tip, of a highly refractory material and containing a thermocouple with a hot junction, said sheath tube being provided with a detachable outer shell made of a material selected from magnesite and highly aluminous bricks and ramming masses, said outer shell having a thickness of between 60 and 80 mm.

References Cited
UNITED STATES PATENTS 2,303,704   12/1942   Oseland _____ 73—343
3,250,125    5/1966   Bonn _____ 73—359

S. CLEMENT SWISHER, Primary Examiner

D. E. CORR, Assistant Examiner

U.S. Cl. X.R.
73—359; 136—234

PO-1050
(5/69)

UNITED STATES PATENT OFFICE
CERTIFICATE OF CORRECTION

Patent No. 3,530,716    Dated September 29, 1970

Inventor(s) M. Truppe et al

It is certified that error appears in the above-identified patent and that said Letters Patent are hereby corrected as shown below:

Col. 1, line 7, "Roferl" should be --Poferl--;

Col. 2, line 51, "$m^2h.\ °C.,$" should read --$m^2.h.°C/Kcal,$--;

Col. 3, line 18, "$s/\lambda 0.0365$" should read --$s/\lambda = 0.0365$--.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents